Figure 1:
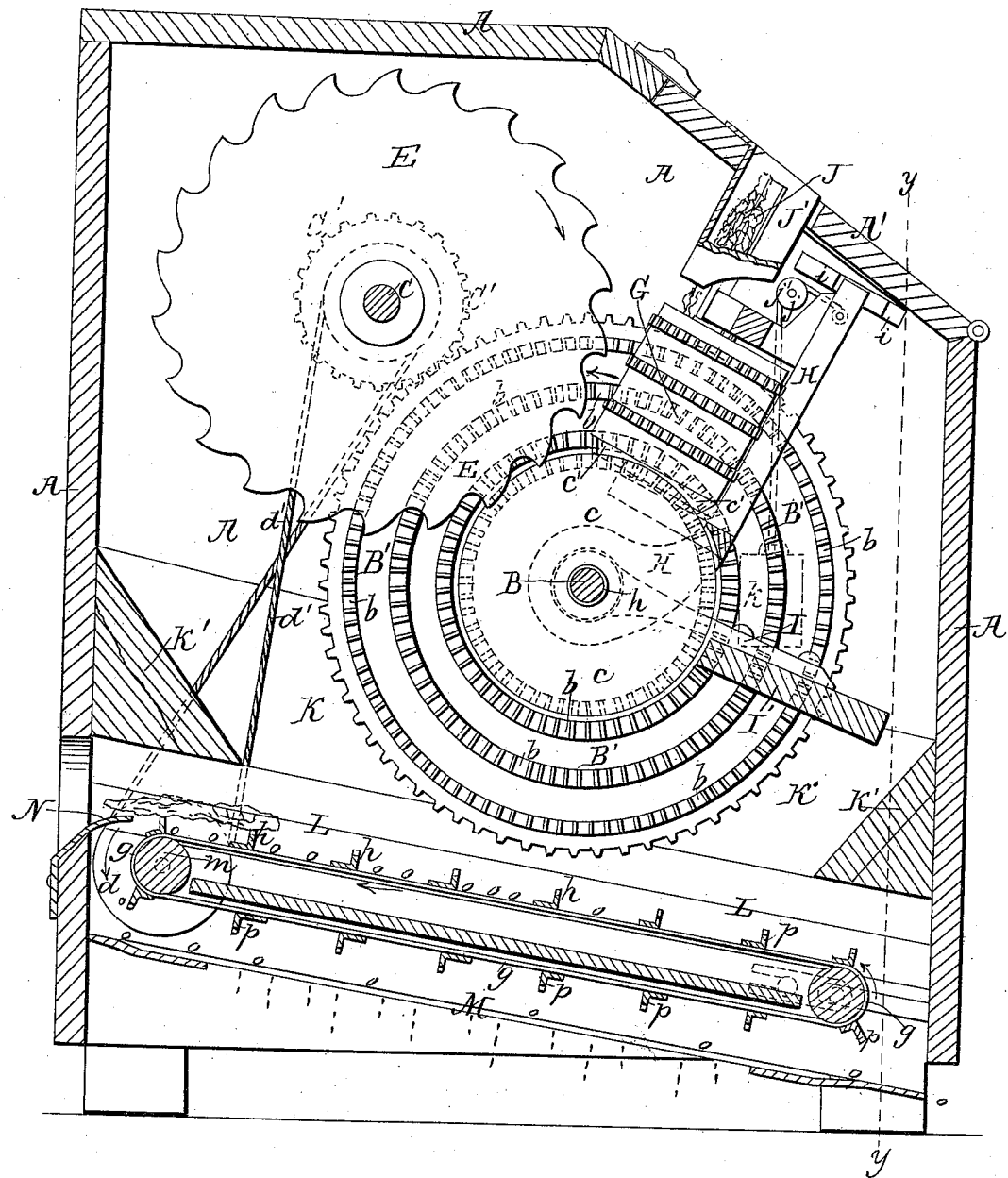

C. C. FRENCH.
Corn Sheller.

No. 31,115.

3 Sheets—Sheet 1.

Patented Jan. 15, 1861.

Witnesses
J W Coombs
R. S. Spencer

Inventor
C C French
per Munn & Co
attorneys

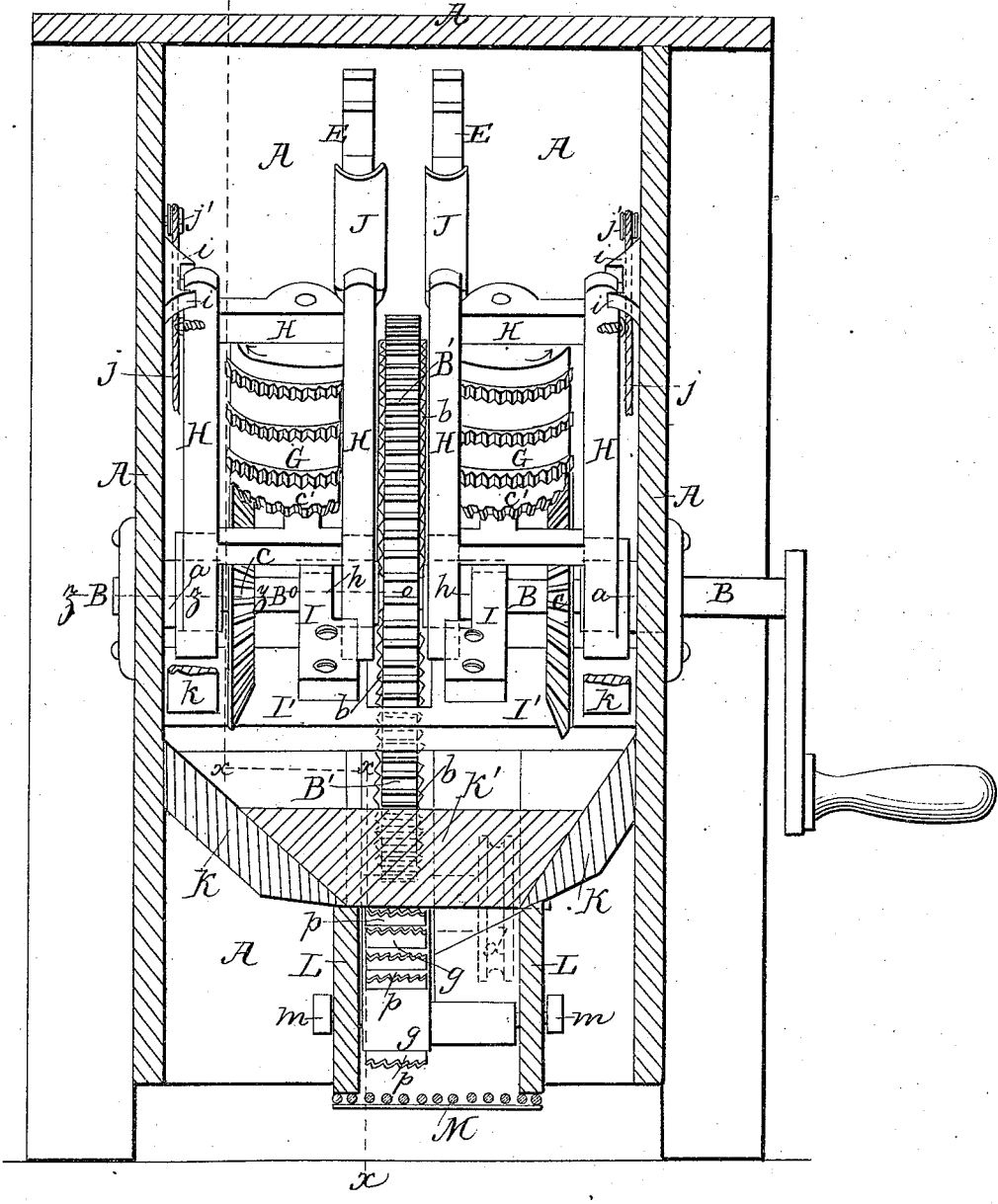

C. C. FRENCH.
Corn Sheller.
No. 31,115.
3 Sheets—Sheet 3.
Patented Jan. 15, 1861.
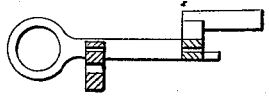
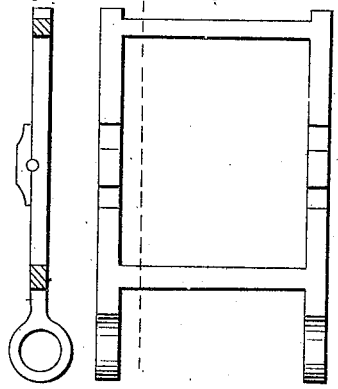
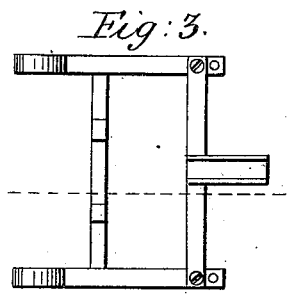
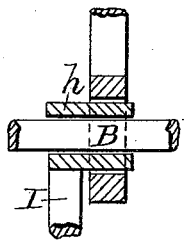
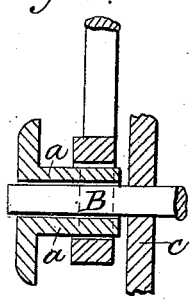
Witnesses
J W Coombs
R. S. Spencer
Inventor
C C French
per Munn & Co
attorneys.

UNITED STATES PATENT OFFICE.

C. C. FRENCH, OF WEST STOCKBRIDGE, MASSACHUSETTS.

CORN-SHELLER.

Specification of Letters Patent No. 31,115, dated January 15, 1861.

*To all whom it may concern:*

Be it known that I, C. C. FRENCH, of West Stockbridge, in the county of Berkshire and State of Massachusetts, have invented a new and Improved Corn-Sheller; and I do hereby declare that the following is a full, clear, and exact description thereof, reference being had to the accompanying drawings, making a part of this specification, in which—

Figure 1, is a longitudinal section through the entire machine taken in the vertical plane indicated by the red lines $x$, $x$, Fig. 2. Fig. 2, is a transverse section through the machine taken in the vertical plane indicated by the red line $y$, $y$, in Fig. 1. Fig. 3, is a plan view of the frame used in the machine of Figs. 1 and 2, for converting it from a double to a single sheller. Fig. 4, is a longitudinal middle section through frame Fig. 3. Fig. 5, is a plan view of a frame which is used to hang the large shelling wheel on when it is desirable to allow this shelling wheel to have a yielding play. Fig. 6, is a longitudinal section through the frame Fig. 5. Fig. 7, is a longitudinal section through one of the bearings of the yielding frame of Figs. 1 and 2, as indicated by the red line $o$, $o$, in Fig. 2. Fig. 8, is a section through one of the bearings of the frame of Figs. 1 and 2, as indicated by the red line $z$ $z$ in Fig. 2.

Similar letters of reference indicate corresponding parts in the several figures.

This invention consists in the arrangement of a rotating disk wheel with toothed or picking surfaces between two large rotating shelling wheels having sharp teeth projecting from their peripheries in combination with two toothed cylinders arranged on an inclined plane in yielding frames, on each side of the single disk wheel, all as will be hereinafter fully explained.

My invention further consists in hanging each cylinder-carrying-frame in such a manner that the pressure of the corn cobs against the cylinders in the operation of shelling the corn from the cob, will operate on bearings partially independent of the shaft of the toothed disk wheel, thereby removing to some extent the friction of the cylinder frame from said disk shaft as will be hereinafter described.

To enable those skilled in the art to make and use my invention I will proceed to describe its construction and operation.

A, A, represents a quadrilateral framework or box for containing and supporting the several parts which are employed in the shelling of corn from cobs; and A′, is an inclined hinged door in the front corner and upper end of the box A, A, through which the corn in the cob is passed as will be hereinafter described.

B, is the main shaft which may be driven by a hand crank as represented in the drawings, but in practice any convenient motive power may be applied to this shaft either through belts and pulleys or otherwise. This main shaft passes transversely through the box A, A, and has its bearings in each side of the box in collars $a$, $a$, one of which is shown in section Fig. 8, and in the middle of the frame A, A, keyed to shaft B, is a large flat disk wheel B′, which has a number of teeth (angular) projecting from each surface in concentric rings $b$, $b$, shown in Fig. 1, on one side of the disk B′. This wheel or picking disk B′, also has spur teeth around its periphery which engage with the teeth of a pinion spur wheel C′, shown in dotted lines in Fig. 1 on the transverse shaft C. The main shaft B, also carries two pinion bevel wheels $c$, $c$, which are keyed to this shaft B, on each side of and at equal distances from the central disk B′. These bevel wheels $c$, $c$, which are both represented in Fig. 2, engage with and transmit rotary motions to bevel wheels $c′$, $c′$, which are on the lower ends of cylinders G, G, as will be hereinafter described.

On each side of the central pinion wheel C′, and keyed to the shaft C, is a large shelling wheel E. These two shelling wheels E, E, work on each side of and close up to the wheel B′, not sufficiently close however to touch the spurs or teeth which project from the surface of this wheel B′, and the shaft C, of these shelling wheels E, E, is elevated above and arranged at such a distance behind the main shaft B, that these shelling wheels E, E, will operate upon the corn on the cobs simultaneously with the cylinders G, G, as will be hereinafter described. The wheels E, E, are furnished on their peripheries with teeth shaped very much like the teeth of a common circular saw but these teeth are quite wide and are intended for shelling the corn from the cobs while the cobs are rotated by the cylinders G, G, which have teeth on them for this purpose, together with the disk wheel B', as will be hereinafter described.

The hub of one of the shelling wheels E, has an annular groove around it, which forms a pulley for driving the pulley d, of an endless apron g, which is arranged below all the hulling apparatus. The motion is tranmitted to pulley d, through the medium of a belt d', as shown in Fig. 1.

H, H, are the two cylinders (G, G,) carrying frames which are each hung respectively on the main shaft B, and on a bearing independent of this shaft in the following manner. The two frames H, H, with their respective cylinders G, G, are precisely alike in their construction and operation, and therefore a description of one will be sufficient to give a clear understanding of the other, the two frames and cylinders are used because the machine is made double i. e. for shelling from two chutes at the same time. The frame H, consists of two longitudinal bars of the same length. These two bars are connected by cross bars which have bearings in them for the axis of the cylinder G, which cylinder is raised somewhat above the cross bars. The outer bar of the frame H, has its bearing on the tubular bearing block a, of the main shaft B, as shown in Fig. 8, and the inner bar of frame H, has its bearing on a tubular collar h, of a standard I, which projects from a transverse bar I', of box A, A, as shown in Figs. 1, 2 and 7, through which collar h, the main shaft B, passes.

The upper end of one of the longitudinal bars of frame H, plays between two projections i, i, from this side of the box A, which regulate or limit the movement of the frame H, and which keep the frame H, and cylinder G, at their proper relative distances from the shelling wheel E. The frame H, just described is arranged on one side of the wheel B', and is hung at an angle of about twenty degrees from a line perpendicular to the axle B, to which it is pivoted and from which it radiates. To the upper end of the frame H, a cord j, is attached which passes forward over a small pulley j', on the side of box A, and hangs down with a suitable weight k, on the lower end as shown in Figs. 1 and 2, which weight has a tendency to keep the frame H, and its cylinder G up toward the shelling disk B', and to allow the entire frame H, with cylinder G, to yield and accommodate themselves to different sized ears of corn. The weight k, also presses the ears of corn up against the shelling wheel E, during the operation of shelling the corn from the cob.

The cylinders G, G, have rows of teeth projecting from their surfaces and they carry on their lower ends bevel spur wheels c', c', which engage with the spur wheels c, c, on the main shaft B, as before described, and these cylinders G, G, receive rotary motion from these wheels c, c, and c', c', in directions indicated by the arrows marked on the cylinders in Fig. 2.

The surfaces of the cylinders G, G, nearly touch the sides of the disk B', and these cylinders G, G, both rotate in opposite directions to the rotation of the disk wheel.

J, J, are chutes which conduct the corn in the cob to the cylinders G, G, and these chutes are connected to and move with their respective frames H, H.

J', J', are chutes which are connected to and pass through the hinged cover A', around the chutes J, J, and allow these chutes or troughs to play in them as the frames H, H, vibrate during the operation of shelling corn. The chutes J, J, and J', J', are in the same vertical planes as the shelling wheels E, E, and they conduct the corn in the cob directly in front of these shelling wheels and between the teeth of these wheels and the surfaces of the cylinders G, G.

K, K, are two longitudinal inclined boards which incline from the sides of the box A, A, toward the middle thereof, and also incline from the rear end to the front end of this box A, A, having a longitudinal space between them.

K', K', are two transverse boards which are also inclined toward the middle of the box from the ends thereof. These inclined boards are arranged under the wheel B', and are intended to conduct the shelled corn together with the cobs into an inclined trough L, which inclines longitudinally from the rear end to the front end of the box A, as shown in Figs. 1 and 2. At each end of this trough L, and extending transversely across it is a roller m, over which rollers an endless apron g, is stretched which receives a revolving motion in a direction indicated by the arrows in Fig. 1, from a pulley d, and cord d', and the shaft C, as before described.

The apron is provided on its outer surface with a number of transverse toothed slats p, arranged at uniform distances apart which with the sides of the trough L, form cells for separating the shelled corn from the cobs and dropping the corn on a grating or sieve M, arranged below and parallel with the trough L.

N, is a division board which prevents the cobs from falling down on the grating M, and which conducts the cobs, only, out at the rear end of the box A, as shown in Fig. 1. The corn falls on the sieve grating M, and as this grating is inclined forward the corn after being divested of its impurities by the grating M, escapes at the front end of the machine into a vessel placed to receive it.

The operation of the entire machine is as follows. Motion is given to the main shaft B, and the parts are all moved in the direction indicated by the arrows in Figs. 1 and 2. The corn on the cob is fed to the shelling wheels through the two chutes J', J', J, J, which conduct it down and drop it between the cylinders G, G, and shelling wheels E, E, on each side of the disk B', if it is desired to double the work by feeding on each side of wheel B'. The ears of corn being received between the wheels E, E, and cylinders G, G, the operation of shelling immediately commences and the cylinders G, G, together with the disk wheel B', hold the ears and rotate them rapidly while the teeth of the wheels E, E, tear the grains of corn from the cobs in a direction with the length of the ears at the same time, the shelling teeth of wheels E, E, move the cobs down toward the lower ends of the cylinders and finally after the cobs are completely stripped of their corn discharge them whence they fall on the revolving apron or separator $g$.

In the operation of shelling, the ears of corn are found to vary very much in size and in order to compensate for this difference in the diameter of the ears the frames H, H, are hung so as to yield and allow the ears to pass between the cylinders G, G, and the teeth of wheels E, E, at the same time the cylinders G, G, are pressed up against the ears by the weights $k$, $k$. The shelled corn and the cobs fall down on the revolving apron $g$, which throws the cobs over the board N, and out at the back of the machine and discharges the grains on an inclined grating M, which separates the chaff and other impurities from the grains and discharges the grains at the front end of the machine.

The frame represented by Figs. 4 and 5, is used in the place of two frames H, H, when it is desired to convert the machine from a double to a single sheller and this frame, of Figs. 4 and 5, is hung at its lower end on the tubular bearings $a$, $a$, of shaft B. The two cylinders G, G, are used with this single frame it being furnished with bearings for the cylinders.

The frame represented by Figs. 5 and 6, may be used to hang the wheels E, E, in so as to allow these shelling wheels to yield in a similar manner to the frames H, H. These two frames are intended merely to change the arrangement of the several shelling parts without destroying their combination and they may or may not be used as found desirable.

Having thus described my invention what I claim as new and desire to secure by Letters Patent, is,

1. The rotating cylinder G, arranged on a yielding frame H, in combination with the disk wheel B' and shelling wheel E, all constructed, arranged and operating as herein set forth.

2. Hanging the longitudinal bars of frame H, on the tubular bearing blocks $a$, and $h$, so that the action of the ears of corn against the cylinder G, will not cause any friction on the main shaft B, substantially as herein set forth.

C. C. FRENCH.

Witnesses:
　Isaac Seeley,
　Abel B. French.